United States Patent [19]
Park et al.
[11] Patent Number: 5,061,774
[45] Date of Patent: Oct. 29, 1991

[54] IMIDE-CONTAINING POLYSILOXANES AND A PROCESS FOR PREPARING THEM

[75] Inventors: Jung O. Park, Daejeon-Si; Myung J. Kim, Seoul; Ju O. Song, Daekoo-Si, all of Rep. of Korea

[73] Assignee: Lucky, Ltd., Seoul, Rep. of Korea

[21] Appl. No.: 435,442

[22] PCT Filed: Mar. 22, 1989

[86] PCT No.: PCT/KR89/00006

§ 371 Date: Nov. 20, 1989

§ 102(e) Date: Nov. 20, 1989

[87] PCT Pub. No.: WO89/09240

PCT Pub. Date: Oct. 5, 1989

[30] Foreign Application Priority Data

Mar. 22, 1988 [KR] Rep. of Korea ................ 1988/3067

[51] Int. Cl.$^5$ ............................................ C08G 77/04

[52] U.S. Cl. ....................................... 528/26; 528/27; 528/28; 525/479; 556/419

[58] Field of Search ............................ 528/26, 27, 28; 525/479; 556/419

[56] References Cited

U.S. PATENT DOCUMENTS

| | | | |
|---|---|---|---|
| 3,981,898 | 9/1976 | Lohse et al. | 260/448.8 |
| 4,517,342 | 5/1985 | Ryang | 521/431 |
| 4,582,886 | 4/1986 | Ryang | 528/28 |
| 4,630,086 | 12/1986 | Sato et al. | 357/23.5 |
| 4,847,344 | 1/1989 | Barthelemy et al. | 528/37 |

FOREIGN PATENT DOCUMENTS

| | | |
|---|---|---|
| 0284519 | 9/1988 | European Pat. Off. . |
| 1618836 | 4/1971 | Fed. Rep. of Germany . |
| 880022 | 5/1958 | United Kingdom . |
| 1364166 | 8/1974 | United Kingdom . |
| 2109390 | 6/1983 | United Kingdom . |

*Primary Examiner*—Melvyn I. Marquis
*Attorney, Agent, or Firm*—Birch, Stewart, Kolasch & Birch

[57] ABSTRACT

A polysiloxane containing terminal imide groups and process for the preparation thereof by a Michael addition reaction comprising reacting a bismaleimide with a polysiloxane diamine. The imide group-containing polysiloxane has good compatibility with organic resins.

7 Claims, No Drawings

IMIDE-CONTAINING POLYSILOXANES AND A PROCESS FOR PREPARING THEM

TECHNICAL FIELD

The present invention relates to a novel polysiloxanes containing imide terminal groups shown by the following formula(I), and to process for preparing the polysiloxanes. Especially, the present invention relates to the polysiloxanes, shown by the following formula(I), which can be effectively used as a modifying agent in the field of synthetic resins.

(I)

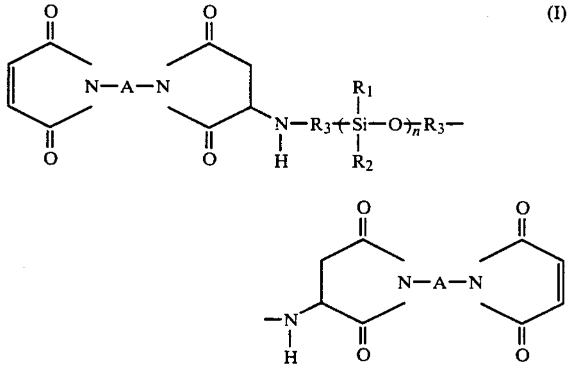

wherein

- $R_1$ and $R_2$, are each methyl, ethyl, propyl or phenyl;
- $R_3$ represents an alkylene having carbon atoms of 1 to 8 or an alkyl substituted alkylene having carbon atoms of 1 to 8;
- n represents an integer of 30 to 400, which indicates the degree of polymerization of the polysiloxane; and
- A represents a divalent group having carbon atoms of at least 2, preferably 2 to 20.

BACKGROUND ART

Recently, there have been widely known, various plastics which have been modified with siloxane compounds.

For the purpose of modifying synthetic resins, polysiloxanes containing hydroxy terminal groups have already been used. In the GB patent No. 880,022, there is disclosed a method of reacting a polyoxyalkylene with a polysiloxane containing two alkoxy groups at ends, to give polyoxyalkylene-polysiloxanediol block copolymers.

Also, a process for preparing new polysiloxanes containing hydroxy terminal groups is proposed in U.S. Pat. No. 3,981,898, in which polysiloxanes containing hydroxy terminal groups are prepared by reacting polysiloxanes with polyols and diols.

However, when said polysiloxanes were used as modifying agents for thermosetting resins such as unsaturated polyesters, epoxy resins and the like, there was a disadvantage in that an excess flash which occurred during the molding process.

On the other hand, in the DE patent No. 1,618,836, there were used trisiloxanols, having hydroxy groups directly bonded to Si atoms, as the plastic modifier. However, such siloxanol compounds have a disadvantage in that it is difficult to process these compounds with organic resins and hence they cannot be suitably used as modifying agents for synthetic resins.

Therefore, the present inventors have eagerly studied to overcome the prior disadvantages as described above, and consequently have developed novel polysiloxanes containing imide terminal groups which are effectively used as modifying agents, especially for thermosetting resins such as unsaturated polyesters, epoxy resins, polyamides and so on.

SUMMARY OF THE INVENTION

An object of the present invention is to provide new polysiloxanes in which both terminals thereof are substituted by imide groups, which are shown by the formula(I).

Another object of the present invention is to provide a process for preparing the polysiloxanes containing imide terminal groups, which are shown by the formula(I).

DISCLOSURE OF THE INVENTION

The present invention relates to the polysiloxanes containing imide terminal groups, shown by the following formula(I), which may be prepared by the Michael addition reaction of a bismaleimide, shown by the following formula(II) and a polysiloxane, shown by the following formula(III) at a temperature of 110° to 150° C.

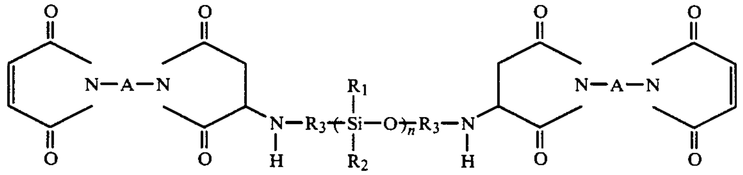

(I)

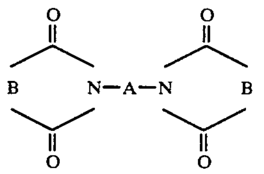

(II)

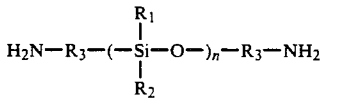

(III)

wherein $R_1$ and $R_2$, are each methyl, ethyl, propyl or phenyl;

$R_3$ represents an alkylene having carbon atoms of 1 to 8 or an alkyl substituted alkylene having carbon atoms of 1 to 8;

n represents an integer of 30 to 400, which indicates the degree of polymerization of the polysiloxane;

A represents a divalent group having carbon atoms of at least 2, preferably 2 to 20; and B represents a divalent group having at least 2, preferably 2 to 6 carbon atoms and containing a carbon-carbon double bond.

In the present invention, the bismaleimides of the formula(II) include, for example, N,N'-1,3-phenylene bismaleimide, N,N'-4,4'-diphenylmethane bismaleimide, N,N'-4,4'-diphenylether bismaleimide, N,N'-4,4'-diphenylsulfone bismaleimide, N,N'-3,4'-diphenylsulfone bismaleimide, N,N'-4,4'-dimethylcyclohexane bismaleimide, N,N'-4,4'-diphenylcyclohexane bismaleimide, N,N'-1,3-xylilene bismaleimide, 2,4-bismaleimide toluene, 2,6-bismaleimide toluene, and so on.

The polysiloxanes of the polysiloxane diamines of the formula(III) include, for example, poly(dimethyl siloxane), poly(methylphenyl siloxane), poly(epoxy-modified siloxane), poly(dimethyl siloxane)-co-poly(diphenyl siloxane), fatty acid-modified polysiloxane, polysiloxane-polyether copolymer, and so on.

According to the present invention, the bismaleimide of the formula(II) is preferably used in an amount of 3 to 10 parts by weight, more preferably 4 to 7 parts by weight, to the polysiloxane diamine of the formula(III) of 30 to 100 parts by weight, more preferably 40 to 60 parts by weight.

The polysiloxanes containing imide terminal groups of the formula(I) which are prepared in accordance with the present invention have some advantages. For example, these polysiloxanes have good compatibility with organic resins, and can be preferably used as modifying agents for thermosetting resins such as unsaturated polyesters, epoxy resins, polyamides, etc. Thus, these, modified resins show markedly shortened flash lengths when molded.

This invention will further be described in detail with the following examples. It should be noted that the present invention is not limited to these examples.

The material properties of the resin compositions which have been prepared by Examples and Comparative examples were evaluated by the method as follows:

Flexural Strength; ASTM D-790

Flexural Modulus; ASTM D-790

Preparation 1

50 g of reactive poly(dimethyl siloxane) diamine were placed in a 100 ml three-neck flask equipped with a stirrer and a thermometer, and preheated to 130° C. After 5 g of N,N'-4,4'-diphenylmethane bismaleimide were added therein, the mixture was reacted for 10 minutes at 130° C. with stirring. When the reaction mixture turns into a highly viscous phase, and it was cooled to room temperature to give the objective polysiloxane.

Elementary Analysis: N; 1.8%, C; 33.2%, H; 8.28%.

IR ($cm^{-1}$): $—NH_2$; $\nu=3,600$ (disappeared in the reaction product), —NH; $\nu=3,750$, —C—N; $\nu=1,350$.

Preparation 2

50 g of reactive poly(methylphenyl siloxane) diamine and 6.5 g of N,N'-diphenylether bismaleimide were placed in a 100 ml three-neck flask equipped with a stirrer and a thermometer. The reaction mixture was heated for 10 minutes at 140° C. with stirring. At the completion of the reaction, the highly viscous reaction mixture was cooled to room temperature to give the objective polysilioxane.

Elementary Analysis: N; 2.1%, C; 32.5%, H; 7.4%.

IR ($cm^{-1}$): $—NH_2$; $\nu=3,610$ (disappeared in the reaction product), —NH; $\nu=3,730$, —C—N; $\nu=1,320$, NMR(ppm) —N—H; $\delta=0.6$.

EXAMPLE 1

5 g of the polysiloxane obtained by Preparation 1 and 95 g of cresol novolak epoxy resin having epoxide equivalent weight of 213 were put in a 300 ml three-neck flask equipped with a stirrer and a thermometer and intensely stirred for about an hour at 150°-160° C. to obtain a resin mixture. The obtained mixture was designated as Mixture A. After cooling the mixture to room temperature, 80 g of this mixture were mixed in a mechanical mixer with 40 g of phenol novolak resin having hydroxy equivalent weight of 306, as the curing agent, 1.1 g of triphenyl phosphine as curing accelerator, 3 g of calcium stearate as the releasing agent, and 337 g of silica powder.

The obtained composition was melt-mixed using a mixer such as an extruder, a kneader and rolls. After immediately cooling the composition in the stage B to room temperature and finely pulverizing said composition, the pulverized composition was placed in an aluminum mold preheated to 175° C., and cured for 3 minutes.

At this time, the aluminum molds which had gaps of 0.005, 0.01 and 0.02 inch, were used for measuring the length of flash produced during molding process.

Afterwards, the cured composition was used for measuring the material properties, and the results were shown in Table 1.

EXAMPLE 2

5 g of the polysiloxane obtained by Preparation 2 and 95 g of the resin composition prepared by Example 1 were placed in a 300 ml three-neck flask equipped with a stirrer and a thermometer, and intensely stirred for about an hour at 150°-160° C. The thus obtained mixture was designated as Mixture B. After cooling the mixture to room temperature, 80 g of this mixture was mixed in a mechanical mixer with the same additives as in foregoing Example 1.

Hereinafter the procedure was the same as in Example 1, and then the results were shown in Table 1.

COMPARATIVE EXAMPLE 1

5 g of the poly(dimethyl siloxane) used in Preparation 1 and 95 g of the epoxy resin used in Example 1 were placed in a 300 ml three-neck flask equipped with a stirrer and a thermometer, and intensely stirred for about an hour at 150°-160° C. The obtained mixture was designated as Mixture C. After cooling the mixture to room temperature, 80 g of this mixture was mixed in a mechanical mixer with the same additives as used in Example 1.

Hereinafter the procedure was the same as in Example 1, and the results were shown in Table 1.

COMPARATIVE EXAMPLE 2

5 g of the poly(methylphenyl siloxane) used in Preparation 2 and 95 g of the epoxy resin used in the Example 1 were placed in a 300 ml three-neck flask equipped with a stirrer and a thermometer, and intensely stirred for about an hour at 150°-160° C. The obtained mixture was designated as Mixture D. After cooling the mixture to room temperature, 80 g of this mixture was mixed in a mechanical mixer with the same additives as used in Example 1.

Hereinafter the procedure was the same as in Example 1, and the results were shown in Table 1.

TABLE 1

| | Example 1 | Example 2 | Comparative Example 1 | Comparative Example 2 |
|---|---|---|---|---|
| Compositions (Unit:g); | | | | |
| Mixture A | 80 | — | — | — |
| Mixture B | — | 80 | — | — |
| Mixture C | — | — | 80 | — |
| Mixture D | — | — | — | 80 |
| Phenol novolak resin | 40 | 40 | 40 | 40 |
| Triphenyl phosphine | 1.1 | 1.1 | 1.1 | 1.1 |
| Silica powder | 337 | 337 | 337 | 337 |
| Calcium stearate | 3 | 3 | 3 | 3 |
| Material Properties; | | | | |
| Flash length* (mm) | 1.3 | 1.3 | 3.2 | 3.1 |
| Flash length** (mm) | 1.3 | 1.8 | 3.8 | 3.7 |
| Flash length*** (mm) | 1.3 | 1.8 | 3.8 | 3.8 |
| Flexural Modulus ($kg/mm^2$) | 1,290 | 1,300 | 1,280 | 1,290 |
| Flexural strength ($kg/cm^2$) | 1,320 | 1,320 | 1,270 | 1,280 |

<Note>
*When the mold having a gap of 0.005 inch was used.
**When the mold having a gap of 0.01 inch was used.
***When the mold having a gap of 0.02 inch was used.

As shown in Table 1, the resin compositions, which comprise the polysiloxanes containing imide terminal groups according to the present invention, have considerably short flash lengths, improved flexural strength, and then excellent processability.

In conclusion, the present invention provides novel polysiloxanes containing imide terminal groups, which are shown by the formula (I) and which can be effectively used as a modifying agent for synthetic resins.

We claim:

1. A polysiloxane containing imide terminal groups represented by formula (I)

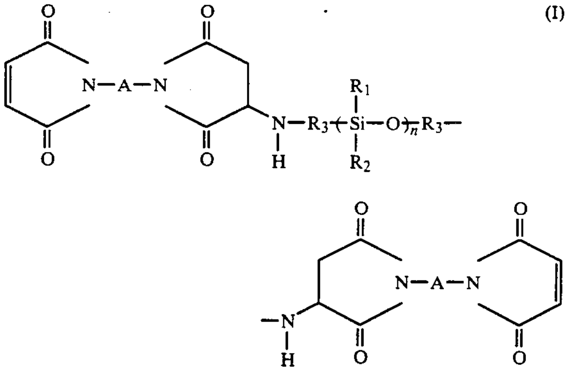

(I)

wherein $R_1$ and $R_2$ are each methyl, ethyl, propyl or phenyl;

$R_3$ represents an alkylene having 1 to 8 carbon atoms or an alkyl substituted alkylene having 1 to 8 carbon atoms;

n represents an integer of 30 to 400; and

A represents a divalent group having at least 2 carbon atoms.

2. A process for preparing a polysiloxane containing imide terminal groups represented by formula (I) by a Michael addition reaction comprising reacting a bismaleimide represented by formula (II) with a polysiloxane diamine represented by formula (III) at a temperature of 110° to 150° C.,

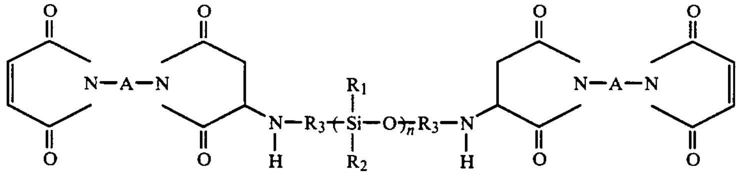

(I)

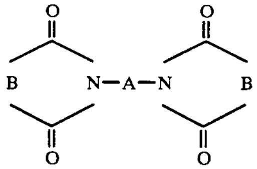

(II)

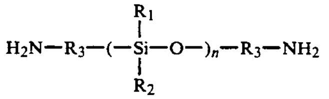

(III)

wherein $R_1$ and $R_2$ are each methyl, ethyl, propyl or phenyl;

$R_3$ represents an alkylene having 1 to 8 carbon atoms or an alkyl substituted alkylene having 1 to 8 carbon atoms;

n represents an integer of 30 to 400;

A represents a divalent group having at least 2 carbon atoms; and

B represents a divalent group having at least 2 carbon atoms and containing a carbon-carbon double bond.

3. The process according to claim 2, wherein the bismaleimide represented by formula (II) is selected from the group consisting of N,N'-1,3-phenylene bismaleimide, N,N'-4,4'-diphenylmethane bismaleimide, N,N'-4,4'-diphenyletherbismaleimide, N,N'-4,4'-diphenylsulfonebismaleimide, N,N'-3,4'-diphenylsulfone bismaleimide, N,N'-4,4'-dicyclohexylmethane bismaleimide, N,N'-4,4'-dimethylcyclohexane bismaleimide, N,N'-4,4'-diphenylcyclohexanebismaleimide, N,N'-1,3-xylilene bismaleimide, 2,4-bismaleimide toluene and 2,6-bismaleimide toluene.

4. The process according to claim 2, wherein the polysiloxane diamine represented by formula (III) is selected from the group consisting of poly(dimethyl siloxane) diamine, poly(methylphenyl siloxane) diamine, poly(epoxy-modified siloxane) diamine, poly(- dimethyl siloxane)co-poly(diphenyl siloxane) diamine and polysiloxane-polyether diamine copolymer.

5. The polysiloxane according to claim 1, wherein A of formula (I) represents a divalent group having 2 to 20 carbon atoms.

6. The process according to claim 2, wherein A of formula (I) represents a divalent group having 2 to 20 carbon atoms.

7. The process according to claim 2, wherein B of formula (II) represents a divalent group having 2 to 6 carbon atoms and containing a carbon-carbon double bond.

* * * * *